United States Patent
Heywood et al.

[11] Patent Number: 5,689,887
[45] Date of Patent: Nov. 25, 1997

[54] HEDGE SHEAR

[75] Inventors: Peter Heywood, Filderstadt; Helmut Achtzehnter, Stuttgart; Theodor M. J. Brouwers, Kaatssheuvel, all of Germany

[73] Assignee: Robert Bosch GmbH, Stuttgart, Germany

[21] Appl. No.: 656,759

[22] Filed: Jun. 3, 1996

[30] Foreign Application Priority Data

Jun. 28, 1995 [DE] Germany ............. 195 22 971.1

[51] Int. Cl.⁶ .................................................. B26B 15/00
[52] U.S. Cl. .................................................. 30/220; 30/216
[58] Field of Search .................... 30/208, 215, 216, 30/220, 228, 369; 74/49, 50

[56] References Cited

U.S. PATENT DOCUMENTS

| | | | |
|---|---|---|---|
| 3,083,457 | 4/1963 | Ottosen et al. | 30/216 |
| 3,897,630 | 8/1975 | Glover et al. | 30/220 |
| 5,031,324 | 7/1991 | Berghauser et al. | 30/369 |
| 5,531,027 | 7/1996 | Martinez et al. | 30/216 |

FOREIGN PATENT DOCUMENTS 3638376  5/1988  Germany.

Primary Examiner—Hwei-Sui Payer
Attorney, Agent, or Firm—Michael J. Striker

[57] ABSTRACT

A motor-driven hedge shear has a housing, a pair of hedge shear cutters extending in a longitudinal direction outwardly of the housing, means for reciprocatingly driving the hedge shear cutters in opposite directions and including a motor shaft, a coulisse transmission provided between the means and the hedge shear cutters, cutter holders provided for supporting the hedge shear cutters and having coulisse ears, the coulisse transmission including toothed gears provided with crank pins engaging in the coulisse ears, a central shaft supporting the toothed gears and having ends rotatably supported in the housing. Two of the toothed gears of the coulisse transmission are arranged on the central shaft so as to be axially spaced from one another, and have facing sides provided with crank pins formed as eccentrically arranged circular discs. The coulisse ears of the cutter holders surround and slidingly guide the crank pins, each of the crank pins having a first opening surrounding the central shaft and being connected with an adjoining one of the toothed gears so as to be rotated by the latter.

13 Claims, 5 Drawing Sheets

ID,689,887

HEDGE SHEAR

BACKGROUND OF THE INVENTION

The present invention relates to hedge shears.

Hedge shears are generally known in the art. German document DE-OS 36 38 376 discloses a motor-driven tool for example a saw, having two reciprocating saw blades. The saw has a coulisse transmission for converting the rotation of the motor shaft into a reciprocating movement of the saw blades. The coulisse transmission is formed by a central spur gear which engages with a pinion of the motor shaft and arranged stationary on a shaft supported in a transmission housing. The spur gear engages in a coulisse-shaped recess of two sliding-block-shaped cutter holders, through its crank pins which are formed as eccentric pins and extend outwardly beyond both flat sides. The two rotating eccentric pins receive the cutter holders and thereby the saw blades reciprocate rectilinearly.

The coulisse transmission of the above described known machine is subjected to substantial wear in the region of the eccentric pins because of the high surface pressure of the force-transmitting parts. Moreover, the spur gear which carries the eccentric pins, in particular the bearing of the shaft which supports it, is subjected to high alternating loads by the force-transmission to the cutter holders since a high tilting moment is formed around the center of the spur gear. The engagement points between the eccentric pins and the cutter holder must be relatively wide, so that because of the tilting of the toothed gear, the cutter holder is not released from the eccentric pin. Because of the great dimensions, the movable parts are heavy. This considerably limits the service life of the coulisse transmission. Moreover, the transmission of the above described machine is not protected from possible impact loads during blocking of the saw blades.

SUMMARY OF THE INVENTION

Accordingly, it is an object of the present invention to provide a hedge shear which avoids the disadvantages of the prior art.

In keeping with these objects and with others which will become apparent hereinafter, one feature of the present invention resides, briefly stated, in a motor-driven hedge shear with a housing for receiving a motor, a hedge shear cutter pair extending forwardly in a longitudinal direction from the housing, a coulisse transmission between the hedge shear cutters and the motor for converting the rotation of the motor shaft into a reciprocating opposite movement of the hedge shear cutters, which cutter holders supporting the hedge shear cutters and having coulisse gears in which crank pins of at least one toothed gear of the coulisse transmission engages, with the toothed gear supported fixedly on a central shaft whose ends are rotatably supported in the housing, wherein in accordance with the present invention the two axially spaced toothed gears of the coulisse transmission are arranged on the shaft near one another and on their facing sides carry crankshafts which are formed as eccentrically arranged circular discs, and therebetween the ring-shaped cutter holders are guidingly slided and engage the crank pins with the coulisse ears, wherein each crank pin engages around the shaft with a first opening and is connected with the neighboring toothed gear so as to be rotated by the latter.

When the hedge shear is designed in accordance with the present invention, it has the advantage of longer service life of the coulisse transmission, since with the crank pins designed as circular discs which engage the central shaft and are supported on it, no tilting moment acts on the spur gear, and the surface pressure between the crank pins and the coulisse ears is smaller because of the diameter which is considerably greater with respect to the eccentric pins. Thereby the hedge shear is lighter and less noisy, and its efficiency is higher. Also, the handling of the hedge shears is better because of its smaller weight and lower vibrations. Moreover, the costs of the manufacture of the inventive hedge shear is lower.

In accordance with another feature of the present invention, the crank pins can be formed as formations of the toothed gear. As a result, separate parts for the crank pins are no longer needed. The manufacture and mounting of the coulisse transmission is further simplified. The hedge shear becomes lighter and easier to manipulate.

In accordance with another advantageous feature of the present invention a sliding coupling is integrated in the coulisse transmission. As a result without increasing the number parts, an especially reliable and also light and compact head shear is provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
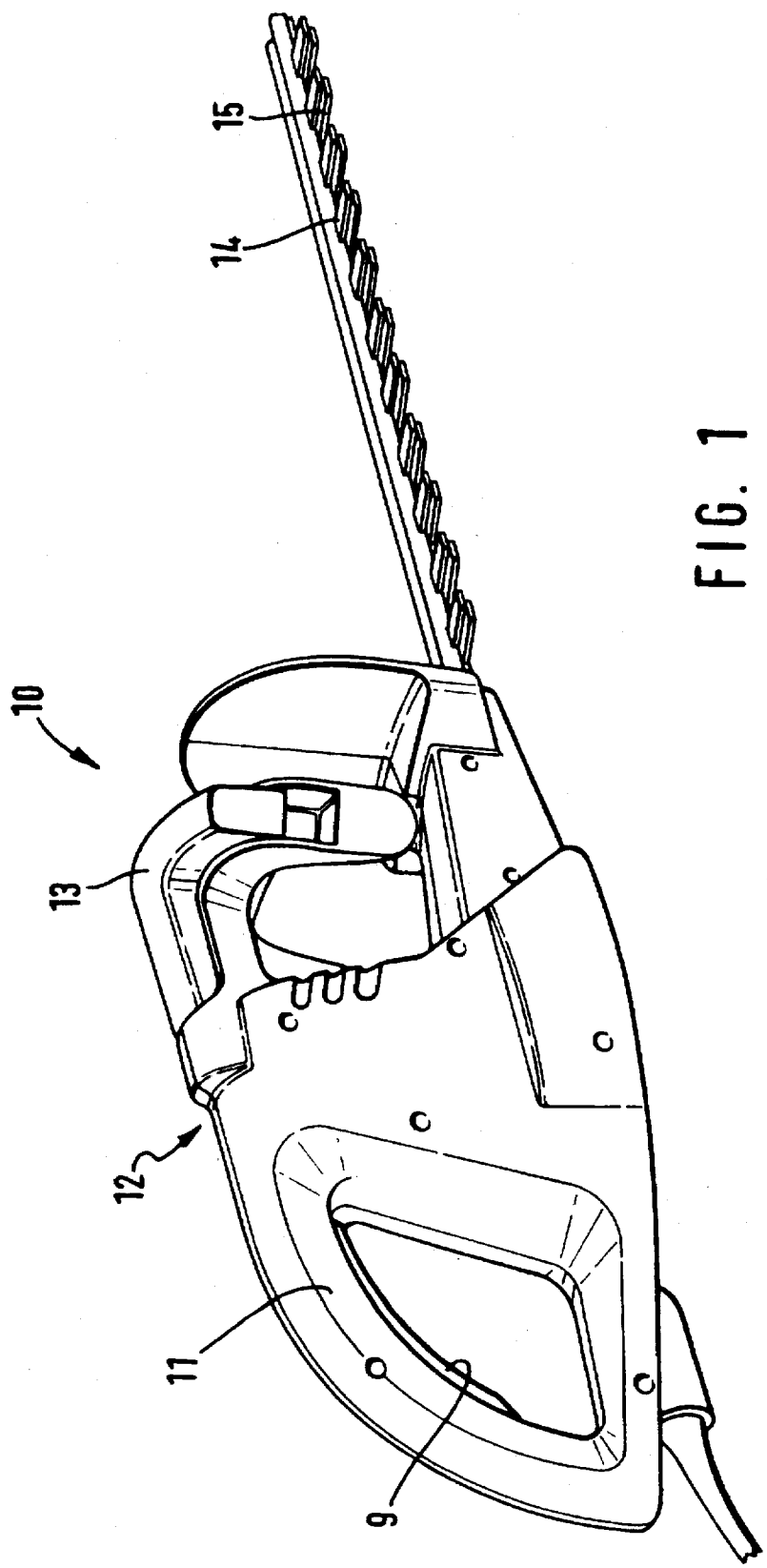
FIG. 1 is a side view of a hedge shear in accordance with the present invention.

A hedge shear shown in FIG. 1 is identified as a whole with reference numeral 10. It has a housing 12, a first handle 11 with a push-button 9, for a not shown electrical operational switch, and a second handle 13. A pair of hedge shear cutters 14 and 15 extends forwardly in the longitudinal direction from the housing. The hedge shear cutters 14 and 15 are driven reciprocatingly by a not shown motor arranged in the housing 12. The rotary movement of the motor shaft 16 is converted into the reciprocating movement of the hedge shear cutters 14 and 15 through a motor pinion 18 and a coulisse transmission 20, shown in FIGS. 2, 4 or 6.

Figure 2:
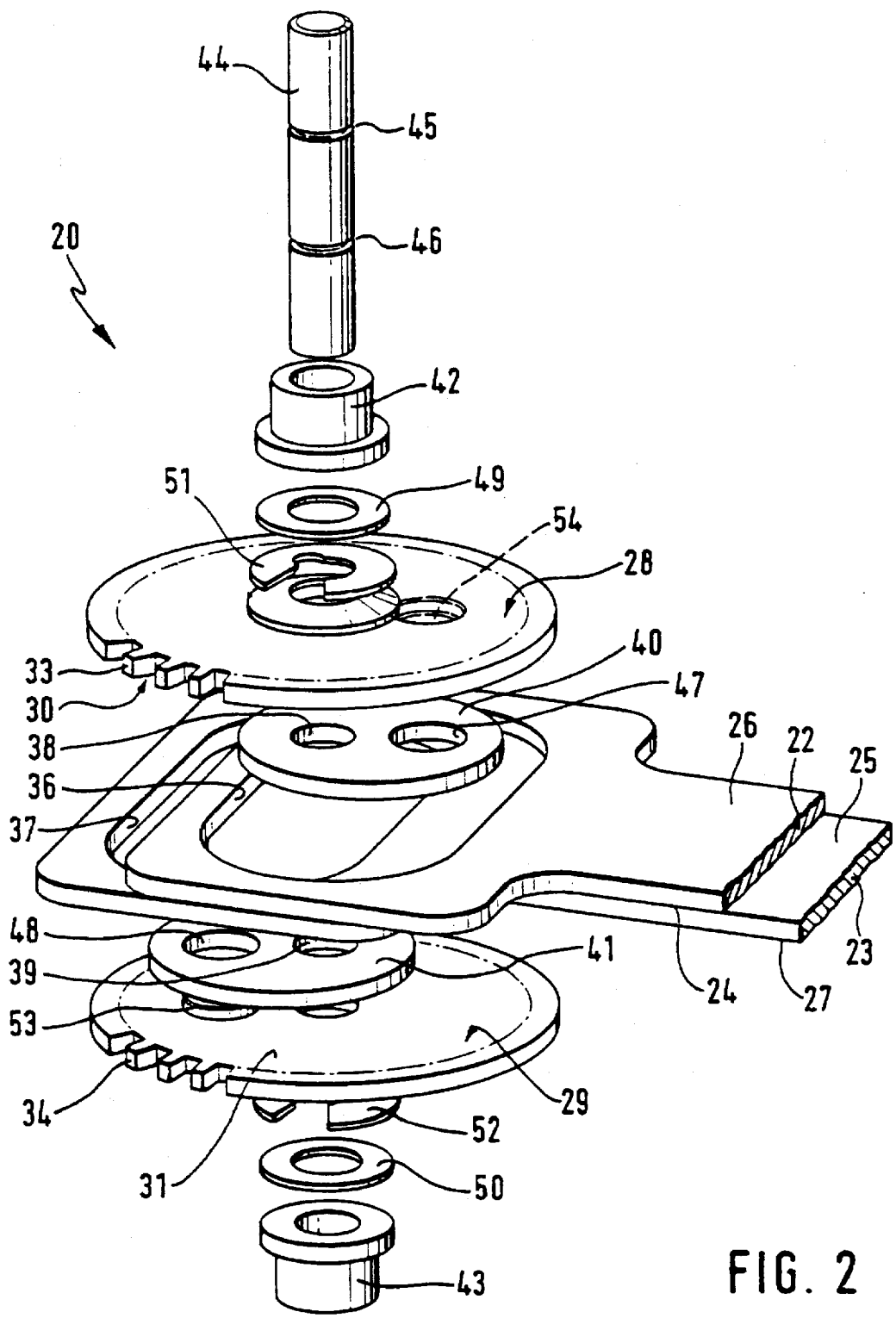
FIG. 2 is an explosion view of a coulisse transmission of the inventive head shear in accordance with a first embodiment.
Figure 3:
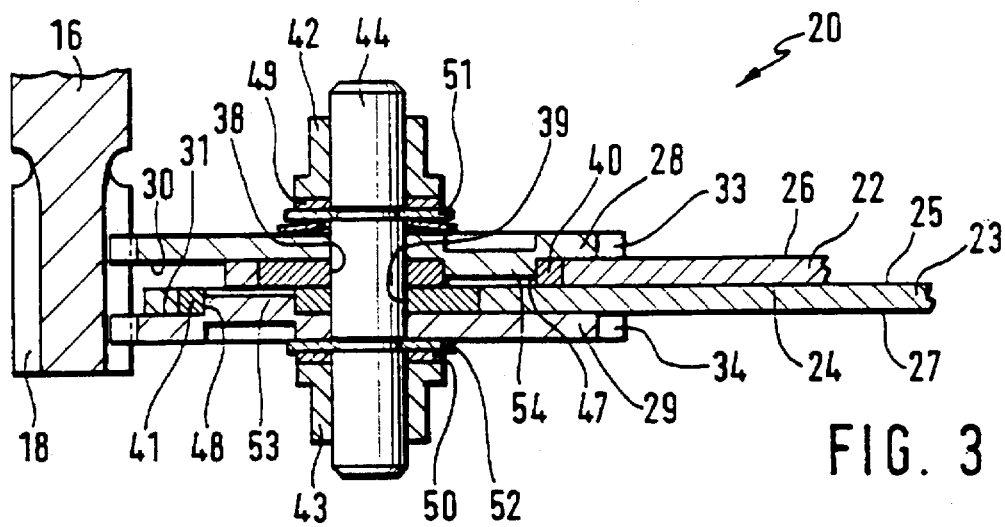
FIG. 3 is a side view of the coulisse transmission of FIG. 2.

It can be seen from the exploded view of the coulisse transmission 20 of FIG. 2, that the ends of the hedge shear cutters 14 and 15 at the side of the housing are connected with cutter holders 22 and 23 formed as sliding blocks. The cutter holders 22 and 23 are arranged directly near one another. During the operation of the hedge shear 10 they slide with their inner flat surfaces 24 and 25 reciprocatingly so as to be supported over one another. Also, the cutter holders 22 and 23 are supported with their outer flat surfaces 26 and 27 between the end sides 30 and 31 of two toothed gears 28 and 29 having outer teeth 33 and 34. The cutter holders 22 and 23 have rounded central recesses formed as coulisse ears 36 and 37 for guidance and engagement of circular disc-shaped, eccentric crank pins 40 and 41, as well as for passage of a central shaft 44. The crank pins 40 and 41 rotating with the toothed gear 28 and 29 slide along the edges of the coulisse ears 36 and 37 transversely to the movement direction of the cutter holders 22 and 23. Thereby a reciprocating movement of the hedge shear cutters 14 and 15 is obtained, as in a crank of Breech transmission. For this purpose the cutter holders 22 and 23 are securely guided in not shown longitudinal guides in the interior of the housing 2 against a transverse displacement.

Each crank pin 40, 41 is provided with two identical first eccentric openings 38, 39. The central shaft 44 which is rotatably supported at both ends in the housing 12 by bearing bushes 42 and 43 extends through the first openings 38, 39 of the crank pins 40 and 41 with a gap. Second eccentric openings 47,48 provide the engagement of the crank pins 40, 41 turned by 180° with an eccentric, pin-shaped drivers 53, 54 secured against rotation on the inner side 30, 31 of the toothed gears 28, 29. The drivers 53, 54 are formed as formations of the inner end sides 30, 31 of the toothed gears 28, 29 and therefore are integral components of the toothed gears.

The outer teeth 33, 34 of the toothed gears 28, 29 extend outwardly beyond the outer contour of the cutter holders 22, 23 and engage with a motor pinion 18. Thereby both toothed gears 28, 29 are displaced independently from one another by the motor pin 18. The central shaft 44 is rotatably supported in the transmission housing 12 in bearing bushings 42, 43. The central shaft 44 has two circumferential grooves 45, 46 for engagement of circlip rings 51, 52. They provide axial securing of the coulisse transmission 20.

The motor shaft 16 which is rotatably supported in the housing 12 and extends parallel to the shaft 44, engages with the motor pinion 18 in the teeth 33, 34 of both toothed gears 28, 29 spaced from one another by the thickness of the crank pins 40, 41. During start of the motor by switching on of the switch with the push-button 9, the motor pinion 18 is rotated and therefore rotates the toothed gear 28, 29. The crankshafts 40, 41 which rotate eccentrically with the toothed gears 28, 29 slide in the coulisse ears 36, 37 of the cutter holders 22, 23 transversely to the longitudinal direction of the hedge shear cutters 14, 15 in reciprocating motion and moves reciprocatingly the head shear cutters 14, 15. Thereby an opposite movement of both hedge shear cutters 14, 15 is performed so that vibrations of the hedge shear during the operation are prevented.

The crank pins 40, 41 have an outer diameter which is greater than their stroke length. Therefore, an especially uniform support of both toothed gears is provided.

It is especially advantageous when the toothed gears 28, 29 are composed of hardened steel and therefore provide an especially stable, wear-resistance sliding guidance of the cutter holders 22, 23. Moreover, the toothed gears 28, 29 are composed of thin steel plates which can be produced by fine punching in an inexpensive way. Due to the coupling of one of the toothed gears 28, 29 with a corresponding one of the hedge shear cutters 14, 15, an especially uniform force-distribution on the motor pinion 18 is possible. Therefore peak loads during impacts are avoided. A further special advantage is that the oppositely moving cutters 14, 15 or the cutter holders 22, 23 are axially slidingly guided on one another between both toothed gears 28, 29, and thereby cannot be released transversely from the crank pins 40, 41.

The coulisse transmission 20 is shown in FIG. 2 on a side sectioned view. The motor shaft 16 is engaged by its motor pinion 18 with the outer teeth 33, 34 of the toothed gears 28, 29. The cutter holders 22, 23 are supported on one another with their inner flat sides 24, 25 and are guided with their outer flat sides 26, 27 between the inner end sides 30, 31 of the toothed gears 28, 29. The inner end sides 30, 31 carry eccentric pin-shaped drivers 53, 54 which are connected of one piece with the toothed gear 28, 29 in form of depressions. They serve as rotation securing elements of the crank pins 40, 41 since they engage in the second eccentric openings 47, 48 of the crank pins 40, 41. The first eccentric openings 38, 39 of the crank pins 40, 41 engage around the central shaft 44 and therefore securely holds the crank pins 40, 41 relative to the toothed gears 28, 29, and at the same time rotate with them around the shaft 44. The crank pins 40, 41 engage in the coulisse ears 36, 37 and are thereby guided.

The drawings clearly shows the arrangement of the sliding bearing bushings 42, 43, the circlip rings 51, 52 engaging in the recesses 45, 46, the spacer rings 49, 50 for axial securing of the coulisse transmission relative to the central shaft 44.

Figure 4:
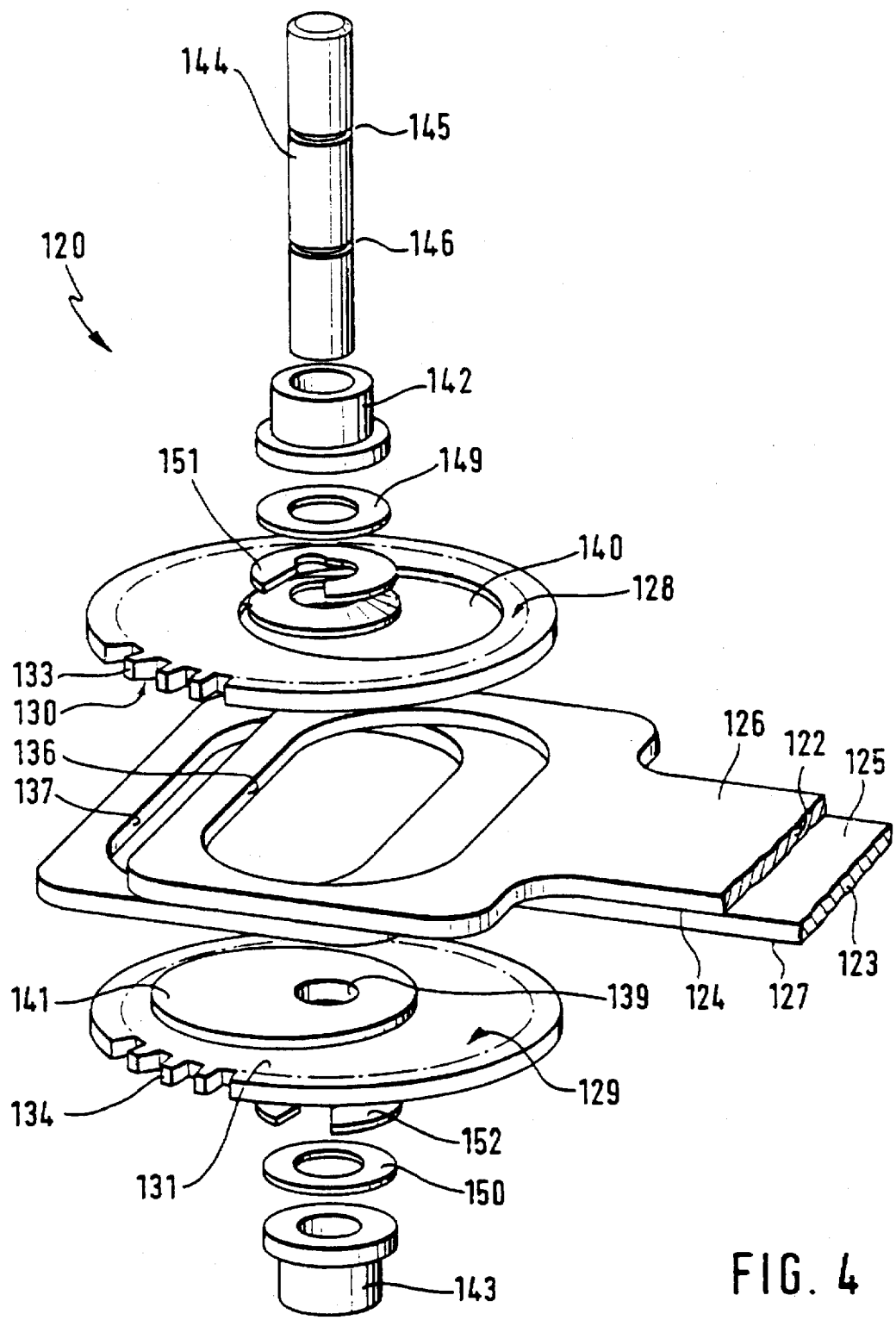
FIG. 4 is an explosion view of the coulisse transmission in accordance with a further embodiment of the invention.

FIG. 4 shows a further embodiment of a coulisse transmission 120 of a hedge shear of FIG. 1. It differs from the embodiment of FIG. 2 in that the crank pins 140, 141 are completely connected with the toothed gears 128, 129 and formed by a punching rod. The separate parts for the crank pins 140, 141 are no longer needed, and the manufacture and mounting of the coulisse transmission 120 is substantially simplified. The hedge shear is lighter than the hedge shear of FIG. 2.

Figure 5:
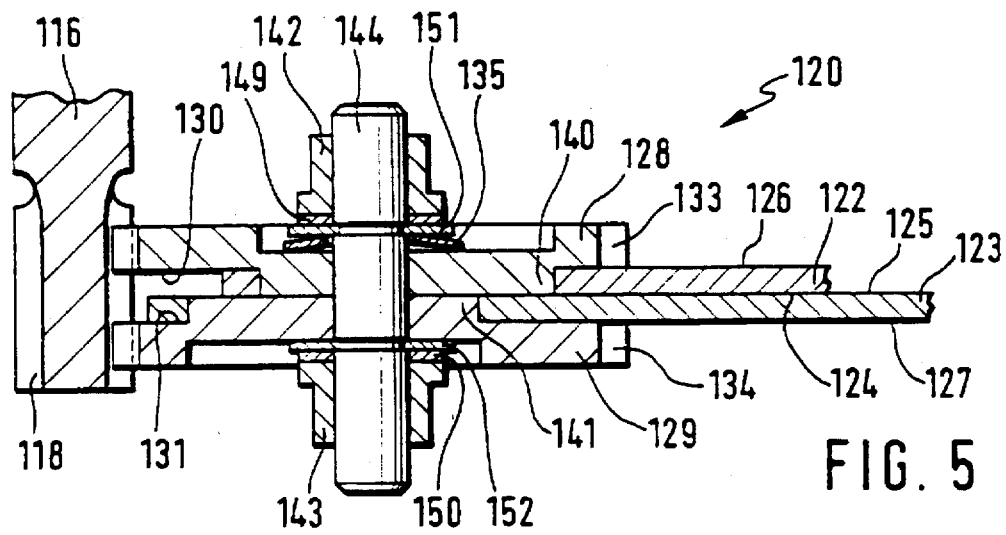
FIG. 5 is a side view of the coulisse transmission of FIG. 4.

FIG. 5 shows the coulisse transmission 120 of FIG. 4 in a lateral section. The motor shaft 116 is engaged by the motor pin 118 with the outer teeth 133, 134 of the toothed gears 128, 129. The cutter holders 122, 123 are supported on one another by their inner flat sides 124,125, and with their outer flat sides 126, 127 are guided between the inner end sides 130, 131 of the toothed gears 128, 129. The inner end sides 130, 131 carry the eccentric crank pins 140, 141 which are connected as punched-out formations of one piece with the toothed gears 128, 129. The crank pins 140, 141 engage in the coulisse ears 136, 137 and are guided in them.

The drawings clearly show the arrangement of the first and second sliding bearing bushings 142, 143, the circlip rings 151, 152 engaging in the grooves 145, 146, the spacer rings 149, 150 for axial securing of the coulisse transmission 120 relative to the central shaft 144.

Figure 6:
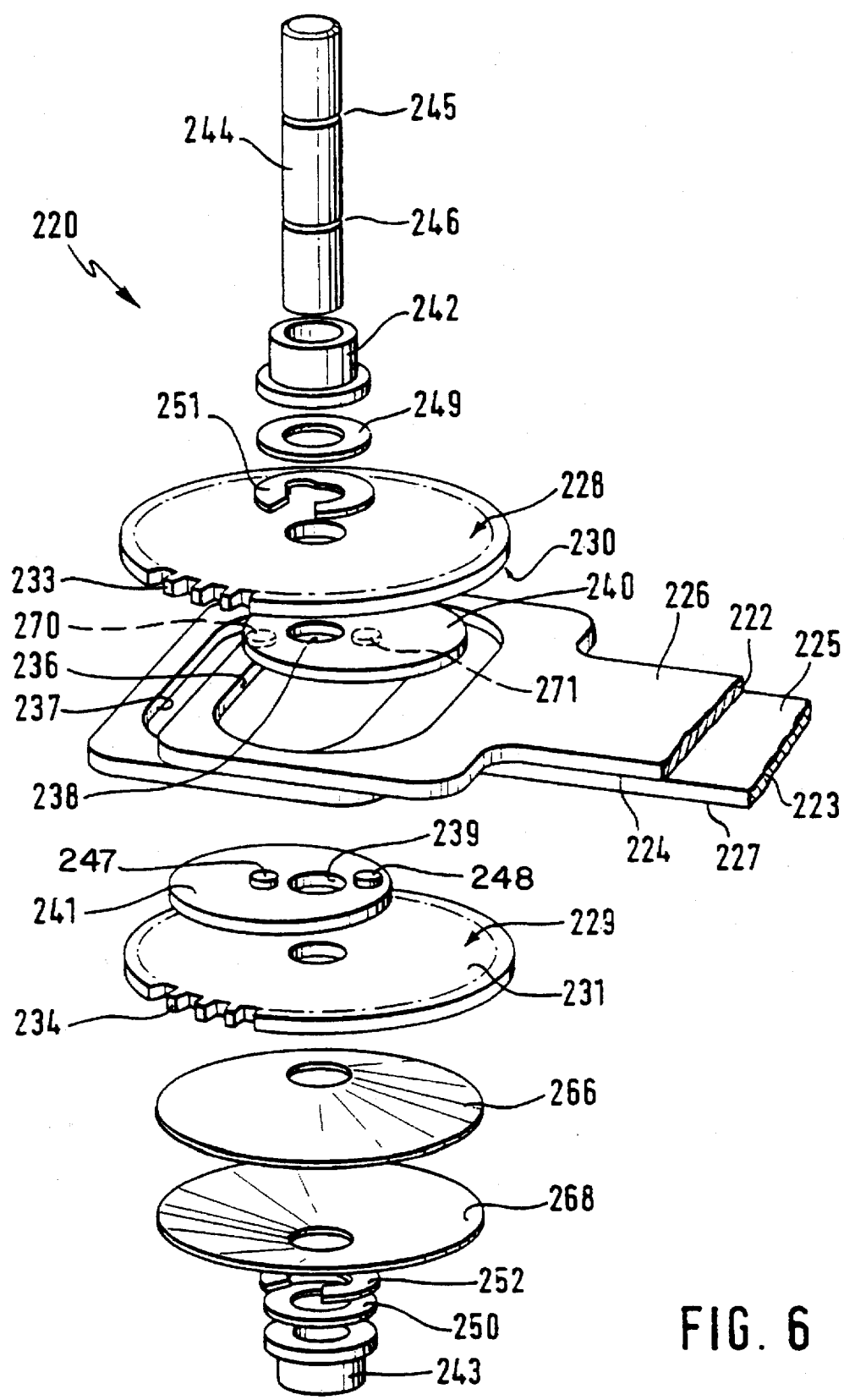
FIG. 6 is an explosion view of an embodiment of the coulisse transmission with an integrated sliding coupling.

FIG. 6 shows an embodiment of a coulisse transmission 220 of a hedge shear with an integrated sliding coupling, based on the examples of FIGS. 2 and 4. In contrast to the preceding embodiments, the crank pins 240, 241 are connected with one another for joint rotation. Only a force transmitting connection is provided between the outer flat surfaces of the crank pins 240, 241 and the inner end sides 230, 231 of the toothed gears 228, 229. The force transmitting connection is provided by the plate springs 266, 268 which axially outwardly adjoin the toothed gears 228, 229 and are centered on the shaft 244. Depending on an adjusted pre-tensioning of the plate springs 266, 268, the form-locking connection between the crank pins 240, 241 and the toothed gears 228, 229 and thereby the limiting moment of the sliding coupling is greater or smaller.

The crank pins 240, 241 have outer end sides facing the toothed gears 222, 229 and provided, in addition to the eccentric opening 238, 239 for passage of the shaft 244, with two punched-out pins 247, 248. Punched-out depressions 270, 271 are formed at opposite end sides of the crank pins 240, 241 and have a diameter somewhat greater than the diameter of the pins 247, 248.

The pins 247, 248 of the corresponding upper crank pin 240 must be cut either flush to their outer surface or compensated by application of a corresponding drilled not shown intermediate disc. Thereby both crank pins 240, 241 can be formed by identical, interengaging punched-out parts.

It is to be understood that instead of the punched-out pins 247,248, separate pins engaging in separate openings can be provided for a pin connection of the crank pin 240, 241 without reducing the holding force of the connection.

When one of the hedge shear cutters 14, 15 or both cutters are blocked, the operation is not stopped suddenly. Instead, the motor shaft 216 with the motor pinion 218 and the teeth 233, 234 can further rotate relative to the crank pins 240, 241 and the hedge shear cutters 14, 15 until the kinetic energy of the movable part is consumed. The outer flat surfaces of the crank pins 240, 241 and the inner end sides 230, 231 of the toothed gears 228, 229 slide over one another.

The impact loading or sudden loading on the motor and the drive and therefore the breakage risk for these parts in the event of blocking is considerably reduced.

Figure 7:
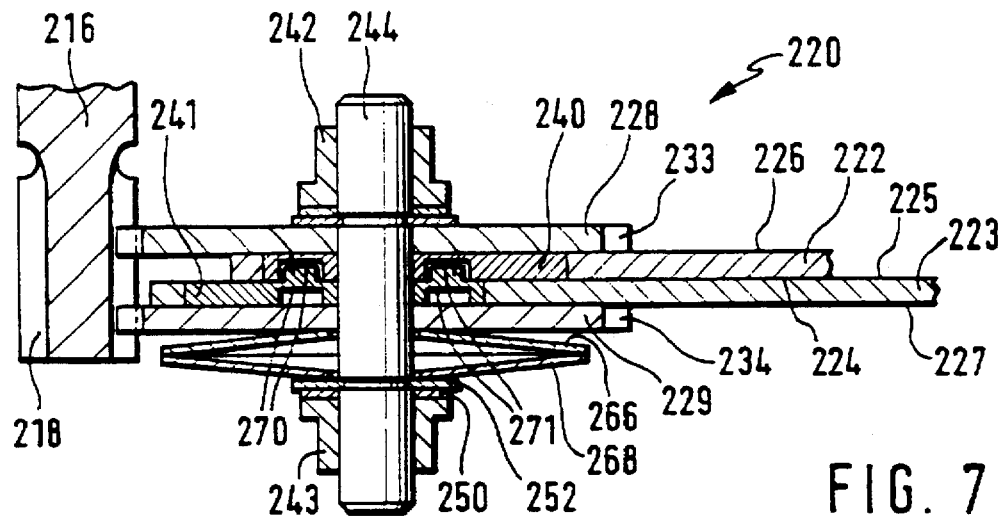
FIG. 7 is a side view of the coulisse transmission of FIG. 6.

FIG. 7 shows the coulisse transmission 220 of FIG. 6 in a lateral section. The motor shaft 216 engages by its motor pinion 218 with the outer teeth 233, 234 of the toothed gear 228, 229. The cutter holders 222, 223 are supported on one another with their inner flat sides 224, 225, and are guided with the outer flat sides 226, 227 between the inner end sides 230, 231 of the toothed gears 228, 229. The inner end sides 230, 231 are supported on the outer sides of the eccentric crank pins 240, 241, which through the pins 247,248 engage in the depressions 270, 271 and provide force transmission. The crank pins 240, 241 engage in the coulisse ears 236, 237 and are guided in them, so that they can convert their circular movement into the reciprocating movement of the cutter holders 222, 223.

The drawing shows the arrangement of the first and second sliding bearing bushings 242, 243, the circlip rings 251, 252 engaging in the recesses 244, 245, 246 the spacer rings 249, 250 for axial securing of the coulisse transmission 220 relative to the central shaft 244, and the plate springs 266, 268.

In a not shown embodiment of the invention, each of the crank pins carries symmetrically to the through-going opening of the central shaft, a depression or an opening and a pin with an outer diameter for engagement in the depression or opening. When both identical crankshafts are placed over one another with their sides which carry the pins and turned relative to one another, the pins engage in the depressions and the connection between the crank pins for joint rotation is obtained. Thereby the sliding coupling is provided in an especially favorable manner but with a low number of parts.

In accordance with still a further, not shown embodiment, the crank pins are provided with two openings which are symmetrical to the through-going opening of the shaft, for passage of separate bolts providing the non-rotatable connection between the crank pins. Thereby the sliding coupling can be produced in an especially favorable manner by identical crank pins and the use of standard parts for the bolts.

It will be understood that each of the elements described above, or two or more together, may also find a useful application in other types of constructions differing from the types described above.

While the invention has been illustrated and described as embodied in a hedge shear, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A motor-driven hedge shear, comprising a housing; a pair of edge shear cutters extending in a longitudinal direction outwardly of said housing; means for reciprocatingly driving said hedge shear cutters in opposite directions and including a motor shaft; a coulisse transmission provided between said means and said hedge shear cutters; cutter holders provided for supporting said hedge shear cutters and having coulisse ears, said coulisse transmission including toothed gears provided with crank pins engaging in said coulisse ears; a central shaft supporting said toothed gears and having ends rotatably supported in said housing, two of said toothed gears of said coulisse transmission being arranged on said central shaft so as to be axially spaced from one another, said two toothed gears having sides which face one another and are provided with said crank pins formed as eccentrically arranged circular discs, said coulisse ears surrounding and slidingly guiding said crank pins, each of said crank pins having a first opening surrounding said central shaft and being connected with an adjoining one of said toothed gears so as to be rotated by the latter.

2. A motor-driven hedge shear as defined in claim 1, wherein each of said crank pins has a further eccentric opening, each of said toothed gears having a driver engaging in said further eccentric opening so as to be form-lockingly coupled with a respective one of said crank pins.

3. A motor-driven hedge shear as defined in 2 claim 1, wherein said crank pins are formed as punched-out parts of said toothed gears.

4. A motor-driven hedge shear as defined in claim 1, wherein at least one of said crank pins is connected with a respective one of said toothed gears in a force-transmitting manner with a predetermined axial force, so that upon reaching a predetermined torque between said drive means and said hedge shear cutters, said at least one crank pin is turnable relative to said one toothed gear to form a sliding coupling between said drive means and said hedge shear cutters.

5. A motor-driven hedge shear as defined in claim 4, wherein two of said crank pins and two of said toothed gears have surfaces provided with a roughness and abut against one another with said surfaces.

6. A motor-driven hedge shear as defined in claim 4; and further comprising spring means axially pressing said at least one crank pin and said one toothed gear toward one another with a predetermined spring force.

7. A motor-driven hedge shear as defined in claim 6, wherein said spring means include plate springs.

8. A motor-driven hedge shear as defined in claim 7, wherein said crank pins together form a single element.

9. A motor-driven hedge shear as defined in claim 8, wherein said single element is an integral one-piece element which forms said crank pins.

10. A motor-driven hedge shear as defined in claim 8, wherein said element is a metal plate deformed by folding so as to form said crank pins.

11. A motor-driven hedge shear as defined in claim 8, wherein said element is a metal plate deformed by punching so as to form said crank pins.

12. A motor-driven hedge shear as defined in claim 1, wherein said crank pins are connected with one another for joint rotation therewith.

13. A motor-driven hedge shear as defined in claim 1, wherein said crank pins having sides facing away from said toothed gears and are connected with one another at said sides for joint rotation therewith, and also connected with said toothed gears by a force-transmitting connection; and further comprising means for connecting said crank pins with one another at said sides and including depressions and projections engaging in one another.

* * * * *